United States Patent [19]

Hostetler

[11] 3,807,359

[45] Apr. 30, 1974

[54] ADJUSTABLE DISPENSING SLEEVE FOR FEED CONVEYOR AND METHOD FOR POSITIONING SAME

[75] Inventor: Eldon Hostetler, Middlebury, Ind.

[73] Assignee: Chore-Time Equipment, Inc., Milford, Ind.

[22] Filed: July 24, 1972

[21] Appl. No.: 274,393

[52] U.S. Cl. .......................................... 119/52 AF
[51] Int. Cl. ............................................ A01k 05/02
[58] Field of Search ....... 119/52 AF, 52 B, 53, 56 R

[56] References Cited
UNITED STATES PATENTS

| | | | |
|---|---|---|---|
| 3,134,478 | 5/1964 | Haen et al. | 119/52 AF X |
| 3,139,860 | 7/1964 | Rutten et al. | 119/56 R X |
| 1,095,489 | 5/1914 | Alford | 119/52 AF UX |
| 3,159,142 | 12/1964 | Bares et al. | 119/52 AF |
| 3,230,933 | 1/1966 | Myers et al. | 119/53 |
| 3,139,862 | 7/1964 | Rutten et al. | 119/52 AF X |
| 3,279,592 | 10/1966 | Kerkvliet | 119/52 AF X |
| 3,077,975 | 2/1963 | Hobbs, Jr. | 119/52 AF UX |
| 3,502,053 | 3/1970 | Geerlings | 119/56 R |

Primary Examiner—James H. Czerwonky
Attorney, Agent, or Firm—Olson, Trexler, Wolters, Bushnell & Fosse, Ltd.

[57] ABSTRACT

An adjustable sleeve member is provided for use with a tube and auger conveyor used for transporting poultry feeds and the like. The sleeve is provided with a dispensing hole which can be brought into registry with a dispensing hole formed in the conveyor tube side to permit feed to be delivered from inside the conveyor tube to an associated receiving hopper. A series of these sleeves are provided along the length of the conveyor tube, and by adjusting the relative angular positions of these sleeves simultaneous feed delivery to all the associated hoppers may be obtained. A method for making these angular adjustments of the sleeves is described and apparatus for use in practicing the method is presented.

7 Claims, 10 Drawing Figures

PATENTED APR 30 1974 3,807,359

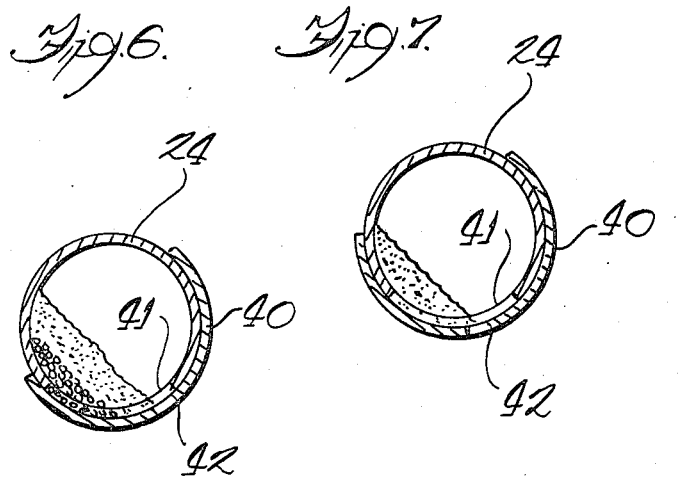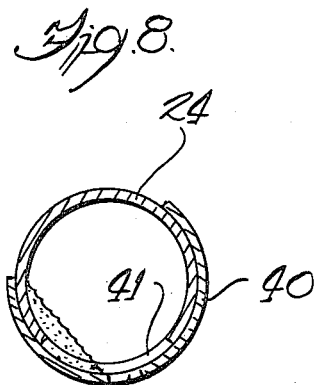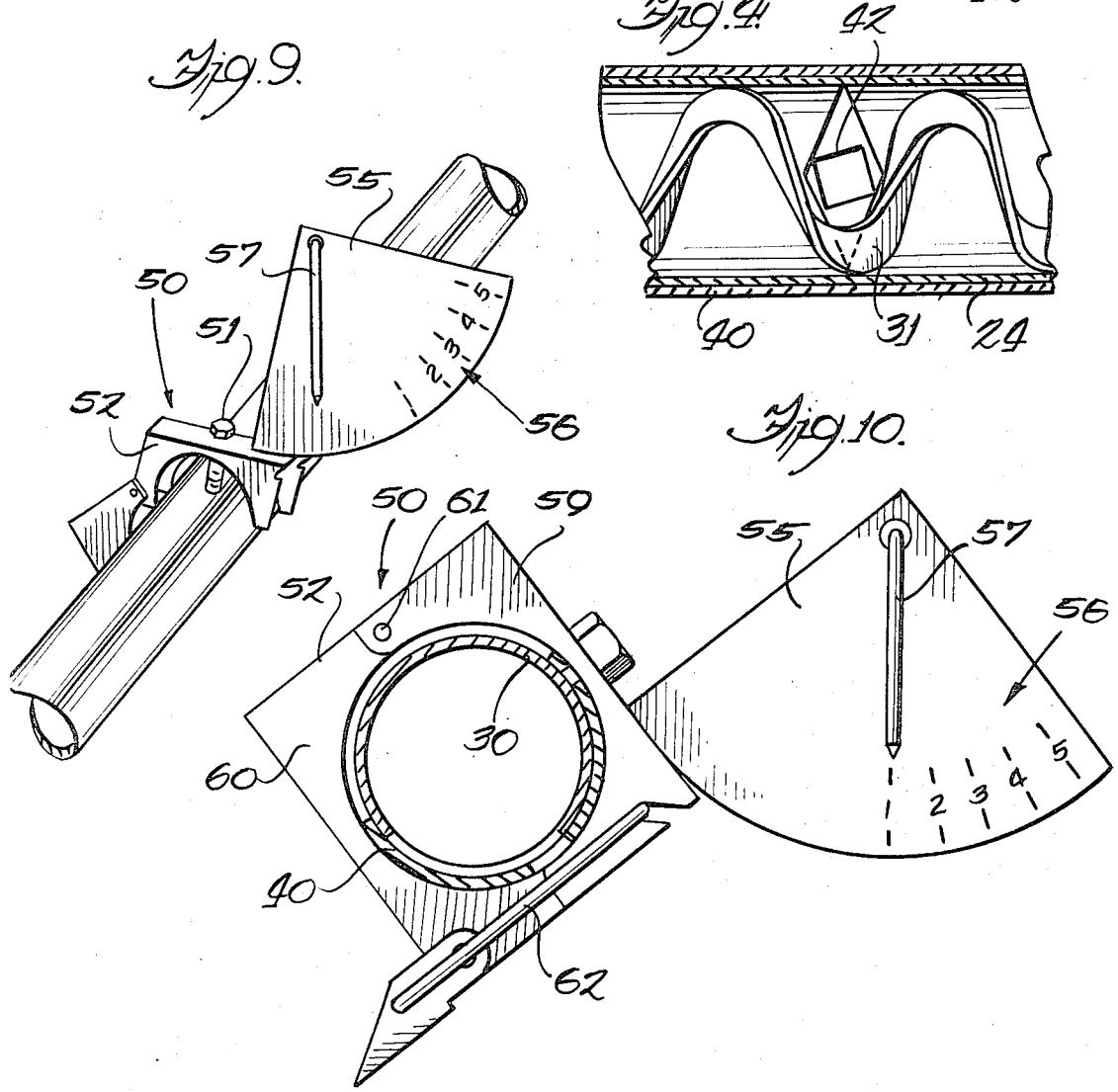

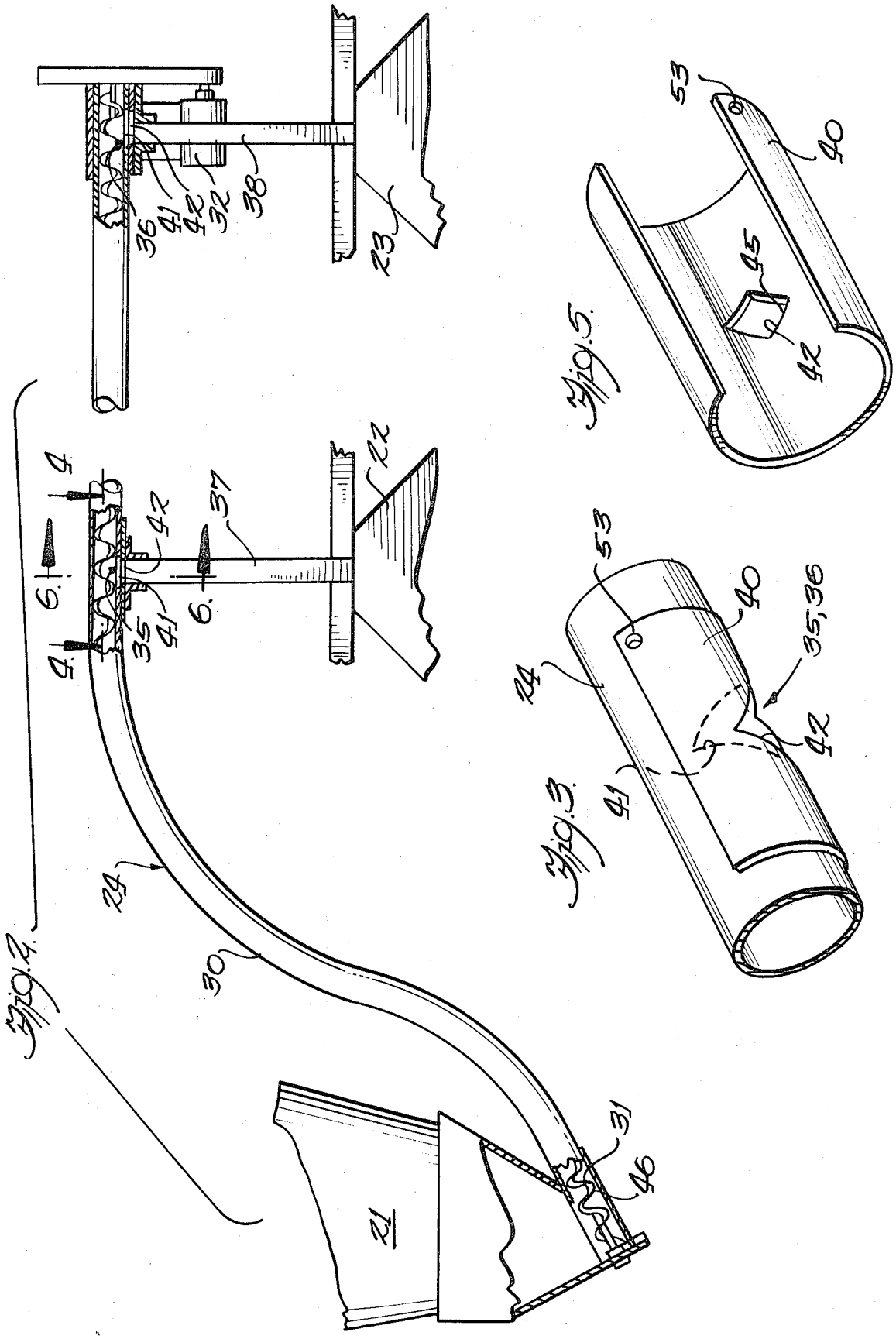

ADJUSTABLE DISPENSING SLEEVE FOR FEED CONVEYOR AND METHOD FOR POSITIONING SAME

DESCRIPTION OF THE INVENTION

This invention relates generally to feeding systems and more particularly relates to a method and associated apparatus for programming a flexible auger and tube conveyor to deliver feed simultaneously to a number of feed-receiving hoppers spaced along the conveyor tube.

Automated systems for feeding poultry and the like such as that described and claimed in Myers et al, U.S. Pat. No. 3,230,933 have met with great commercial success. Generally, these systems include a bulk feed storage bin and a number of feed-receiving hoppers. To deliver feed from the storage bin to the hoppers, a first conveyor is provided, which may include a hollow tube and an auger member rotatably disposed therein. From the hoppers, feed is dispensed down second conveyor tubes to feeding stations, where it is deposited for consumption by the flock.

In at least some of the known systems, several feed-receiving hoppers are spaced along the first conveyor tube, and receive feed in seriatim order from the storage bin. In these systems, feed is brought from the bin, by the action of the auger, to a dispensing hole in the conveyor tube, where it is dropped into the hopper. When the first hopper, located closest to the storage bin, is completely filled and the dispensing hole is closed off, subsequent feed is transported further down the conveyor tube by the auger to a second dispensing hole associated with a second hopper. This hopper filling scheme is repeated until the last hopper is filled; thereafter, conveyor operation is automatically or manually halted.

When the auger conveyor is operated in this manner, upstream portions of the conveyor are effectively lubricated by feed particles which work their way between the rotating auger and the stationary tube. However, since downstream portions of the conveyor carry little if any feed, these parts are operated in a relatively unlubricated state. A metal-to-metal scraping action can result between the auger and the tube.

It is therefore an object of the present invention to provide a feed-transporting conveyor having a conveyor tube and an auger wherein feed is distributed substantially along the entire length of the conveyor tube at all times. When feed is thus distributed within the conveyor tube, a lubricating effect is provided to the entire length of the rotating auger, thereby requiring less power for conveyor operation, and reducing wear and metal particles which might be deposited in the feed.

It is another object of the invention to provide a conveyor for distributing feed to receiving hoppers wherein the conveyor feed-dispensing holes can be programmed or adjusted so as to insure relatively rapid and simultaneous delivery of feed to all the receiving hoppers.

It is yet another object of the invention to provide a tube and auger conveyor for delivery of feed mixture to a number of hoppers wherein delivery of properly proportioned amounts of feed mix constituents to each hopper is encouraged.

Other objects and advantages of the invention will become apparent upon reading the following detailed description and upon reference to the drawings, in which:

FIG. 2 is a fragmentary elevational view taken substantially in the plane of line 2—2 in FIG. 1 showing in further detail the bin-to-hopper or first conveyor associated with the present invention, portions of the auger tube and associated parts being broken away for clarity;

FIG. 3 is a fragmentary perspective view of a typical portion of the conveyor tube and adjustable outlet sleeve associated with the present invention;

FIG. 4 is a sectional view taken substantially in the plane of line 4—4 in FIG. 2 and showing in further detail the relationship between the auger, the tube, the sleeve, and the dispensing holes formed in the tube and sleeve;

FIG. 5 is a perspective view showing in further detail a typical conveyor tube adjustable outlet sleeve;

FIG. 6 is a cross-sectional view taken substantially in the plane of line 6—6 in FIG. 2 showing the sleeve oriented for use in conjunction with a relatively upstream dispensing location;

FIG. 7 is a sectional view taken substantially in the plane of line 6—6 in FIG. 2, similar to FIG. 6 and showing the sleeve oriented for use in conjunction with a relatively midstream dispensing location;

FIG. 8 is a sectional view taken substantially in the plane of line 6—6 in FIG. 2 similar to FIG. 6 and showing the sleeve oriented for use in conjunction with a relatively downstream dispensing location;

Figure 1:
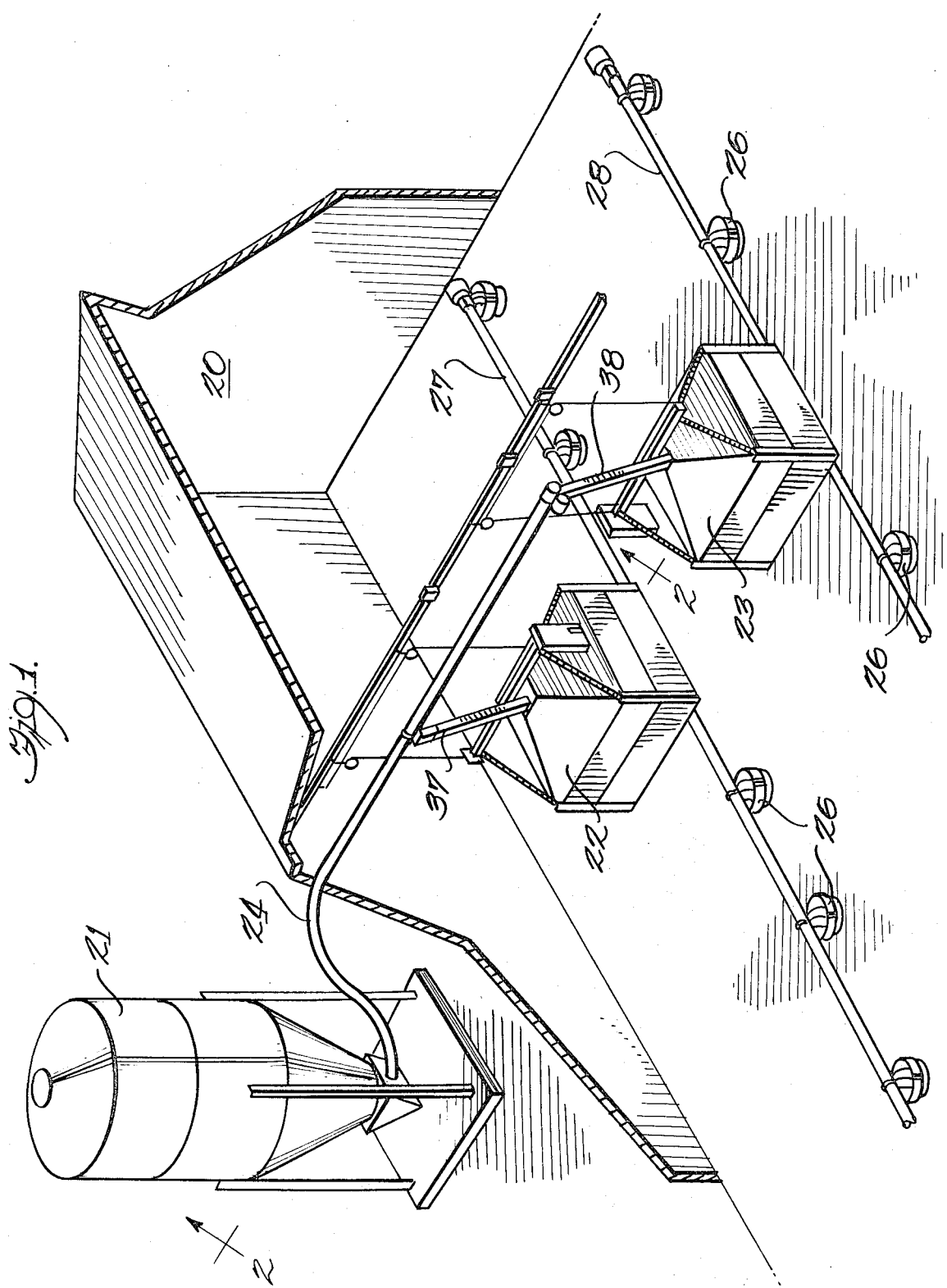
FIG. 1 is a perspective view showing in general a feed distribution system including an embodiment of the present invention.

FIG. 9 is a perspective view showing the outlet sleeve and an associated positioning gage used for locating the sleeve on the conveyor tube in the desired orientation; and FIG. 10 is a sectional view taken substantially in the plane of line 6—6 in FIG. 2 showing in further detail the outlet sleeve and the associated orienting gage, as the gage, sleeve and tube appear when the sleeve is being oriented in its programmed position on the conveyor tube.

While the invention will be described in connection with a preferred embodiment and procedure, it will be understood that it is not intended to limit the invention to that embodiment or procedure. On the contrary, it is intended to cover all alternatives and modifications as may come within the spirit and scope of the invention. In the following description, like reference numerals refer to like parts throughout the drawings.

Turning first to FIG. 1, there is shown a general view of the feeding system embodying the present invention. A poultry or livestock house 20 is provided with a feeding system having a bulk storage bin 21 and a number of feed-receiving hoppers 22, 23. To deliver feed from the storage bin 21 to the receiving hoppers 22, 23, a first or delivery conveyor 24 is provided. Feed is moved from the hoppers 22, 23 to various feeding stations 26 by means of second or dispensing conveyors 27, 28 associated with each of the hoppers 22, 23.

As may be seen best in FIG. 2, the first or delivery conveyor 24 includes a hollow tube 30 and a flexible auger 31 carried therein. The auger 31 is mounted for rotation by a motor 32 or other drive means for pushing the feed received from the storage bin 21 along the conveyor tube 30. When the feed reaches outlets 35, 36 associated with the hoppers 22, 23, the feed falls from the conveyor 24, and is directed into the hoppers 22, 23 by respective drop tubes 37, 38.

In accordance with the invention, each outlet 35 and 36 is provided with an adjustable sleeve member 40, by which the feed outlets 35 and 36 may be programmed to deliver feed simultaneously to the associated hoppers 22 and 23. To insure positive engagement of the conveyor tube 30, the sleeve member 40 is curved and extended to comprise a portion of a right cylinder and to fit over the portion of the conveyor tube wall adjacent the tube dispensing hole 41, as best seen in FIG. 3 and is provided with a dispensing hole 42. To snugly attach the sleeves 40 to the tube 24 with a presslike fit, the illustrated sleeve 40 is formed in the shape of a portion of a right cylinder having an unstrained inner diameter slightly smaller than the outer diameter of the conveyer tube 24. Those skilled in the art will understand that the sleeves are formed of any convenient material such as rolled steel which affords sufficient flexibility to permit the sleeves 40 to be slightly strained so as to slide over the tube 24 yet be retained on the tube 24 with a snug interference or press-like fit.

It is a feature of the invention that the holes 41 formed in the conveyor tube 30 itself can be spaced along the tube at axial positions corresponding to the desired locations of the associated hoppers 22 and 23, but in angular alignment with one another, to permit easy tube fabrication at the factory. Thereafter, during the erection of the feed system at the construction site, the sleeves 40 can be placed around the conveyor tube 24 and angularly rotated into the desired respective positions, so as to cause dispensation of feed relatively simultaneously to all the hoppers 22, 23. To this end, the feed dispensing outlet is effectively completely defined by the dispensing hole 42 formed in the sleeve 40, and the sleeve dispensing hole 42 is so formed as to allow its complete and unrestricted registry with the tube dispensing hole 41.

In accordance with another aspect of the invention, delivery of properly proportioned feed mix constituents is encouraged. To this end, the dispensing hole 42 formed in the sleeve is provided with a trailing edge 45 oriented generally parallel to the flight 46 of the auger 31. When the auger flight 46 pushes feed toward the sleeve hole 42, a quantity of feed having a cross-section of relatively uniform thickness is dispensed to the hopper. The increment thus dispensed contains a generally proper proportional amount of all the constituent particles of the feed mix. To allow a relatively large quantity of feed to be delivered rapidly to the hoppers in accordance with a feature of the invention, the outlet hole in the sleeve takes the form of a diamond, as shown in FIG. 4.

In accordance with another aspect of the invention, an alignment gage 50 is provided to permit conveyor installing personnel to align the sleeve 40 in a precisely pre-determined angular position to encourage the described relatively simultaneous feed distribution to the hoppers. To attach the gage to the sleeve member 40 in a pre-determined angular position, positioning means are provided which take a form of a pin 51 located upon a gage collar 52; the pin 51 is formed to engage a locating hole 53 formed in the sleeve 40.

To orient the sleeve 40 in the desired angular position, the gage 50 includes a scale plate 55 and scale 56 marked in desired angular positions for the sleeves. A plumb pointer 57 is pivotally mounted on the plate 55 to hang in a vertical position and indicate the actual angular position of the gage and sleeve to which the gage is temporarily attached. As the sleeve 40 and attached gage 50 are rotatably or angularly turned or slid over the tube 30, the scale 56 effectively pivots under the plumb pointer 57 through a range of positions. As may be envisioned from FIGS. 9 and 10, the collar 52 comprises upper and lower portions 59, 60 which are pivotally connected by a collar pin 61 to enable the collar and attached gage parts to be quickly and easily emplaced around the sleeve 40. An over-center clamp structure 62 of known construction is provided to secure the collar 52 around the sleeve 40.

To program the feeder system conveyor tube 30 at the construction site for encouraging simultaneous and equal dispensation of feed through the dispensing outlets 35 and 36, the sleeves 40 may be temporarily installed upon the conveyor tube 30 at any desired angular position so that the sleeve holes 42 are in axial registration with the tube holes 35 and 36. The alignment gage 50 is then temporarily installed upon a sleeve 40 by engaging the alignment pin 51 with the sleeve alignment hole 53 and securing the collar 52 around the sleeve by the over-center clamp 62. The sleeve member 40 is then angularly rotated to position the sleeve member and its dispensing outlet hole 42 in a desired angular position, as indicated by the coincidence of the plumb pointer 57 with the appropriate hack mark upon the scale 56. The alignment gage 50 is then removed from the aligned sleeve 40 and is attached to a succeeding sleeve member. When all the sleeves have been aligned as described, the dispensing holes formed in the sleeves form a helical array of extended pitch.

I claim:

1. For use with a conveyor for feed and like materials, said conveyor including a hollow tube along which the feed can move for dispensation through at least one hole formed in the tube wall, a rotatably and longitudinally slidable sleeve member mounted on said tube and comprising more than half of a right circular cylinder, the unstrained inner diameter of said cylindrical sleeve member being smaller than the outer diameter of said conveyor tube, the cylindrical sleeve member, when strained, being curved and extended to fit over the conveyor tube, the cylindrical sleeve member, when strained, being curved and extended to fit over the conveyor tube adjacent the tube dispensing hole with a press fit, and a temporarily attachable alignment gage means mounted on said sleeve member for locating the sleeve member in a desired position relative to the conveyor tube.

2. For use with the structure of claim 1 said alignment gage means including attachment means for attaching the gage means to said sleeve member to thereby position the gage means in a pre-determined angular position relative to the sleeve member and the dispensing hole formed in said sleeve member, plumb indicator means for indicating the actual angular position of the sleeve member and attached gage means relative to a vertical orientation, and means for indicating the desired angular position of said sleeve member relative to said vertical orientation.

3. A sleeve member according to claim 1 wherein said conveyor includes an auger member having a plurality of flights, and wherein said dispensing hole formed in said sleeve member is shaped substantially in the form of a diamond, a trailing edge of said diamond hole being oriented generally parallel to an adjacent auger flight to encourage the delivery of properly proportioned feed mix components through said dispensing hole.

4. Gage means for use in adjusting a feeder system of the type having a dispensing storage bin, a plurality of feed-receiving hoppers and at lease one conveyor tube connecting the dispensing bin and the receiving hoppers, the conveyor tube including a number of dispensing holes formed in the tube wall in angular alignment and having rotatably and longitudinally mounted thereon a corresponding number of slidable dispensing sleeves having dispensing holes formed therein to permit the flow of feed from the tube to the receiving hopper, said gage means including attachment means for attaching the gage means to said sleeve member to position the gage means in a pre-determined angular position relative to the sleeve member and the dispensing hole formed in said sleeve member, means on said gage means for indicating the actual angular position of the sleeve member relative to a vertical orientation, and means on said gage means for indicating the desired angular position of each said sleeve member, whereby said dispensing holes formed in said sleeve members may be oriented in a helical array of extended pitch.

5. A method of adjusting a feeder system conveyor tube for encouraging simultaneous and equal dispensation of feed from a storage bin through a plurality of spaced dispensing holes arrayed along the tube to feed-receiving hoppers, by the use of an alignment gage, the conveyor tube having a plurality of individually adjustable sleeve members axially spaced along the conveyor tube, each sleeve member having at least one feed-dispensing hole therein, the alignment gage having means for indicating the actual angular position of a sleeve member to which the gage is attached, and means for indicating the desired angular position of said sleeve member, said method comprising the steps of temporarily installing said sleeve members on the conveyor tube, temporarily attaching an alignment gage to a first sleeve member in a pre-determined position relative to the sleeve member and the dispensing holes formed therein, angularly rotating said first sleeve member on the conveyor tube to position the sleeve member and its dispensing outlet in a desired first determined angular position, axially moving said sleeve member to align said sleeve member dispensing hole with a hole formed in the conveyor tube wall, removing said alignment gage from the oriented sleeve member, attaching said alignment gage to a succeeding sleeve member, angularly positioning and axially adjusting the succeeding sleeve member into another desired pre-determined angular position, and successively angularly positioning and axially adjusting all the remaining sleeve members on said conveyor tube.

6. For use with a conveyor for feed and like materials, said conveyor including a hollow tube along which the feed can move for dispensation through a plurality of axially spaced, angularly aligned holes formed in the tube wall, a corresponding plurality of individual, rotatably and longitudinally slidable sleeve members, each sleeve member comprising more than half of a right circular cylinder, the unstrained inner diameter of said cylindrical sleeve member being smaller than the outer diameter of said conveyor tube, the cylindrical sleeve members, when strained, being curved and extended to fit over the conveyor tube adjacent each tube dispensing hole with a press fit, each cylindrical sleeve member having formed therein a dispensing hole smaller than the tube dispensing hole and adapted for registry therewith, said sleeve dispensing holes being oriented on the conveyor tube in a helical array of extended pitch with respect to said tube dispensing holes.

7. A plurality of sleeve members according to claim 6 wherein each sleeve dispensing hole is in complete and unrestricted registry with the adjacent tube dispensing hole.

* * * * *